(12) United States Patent
Kennedy et al.

(10) Patent No.: US 11,790,652 B2
(45) Date of Patent: *Oct. 17, 2023

(54) DETECTION OF CONTACTS AMONG EVENT PARTICIPANTS

(71) Applicant: Disney Enterprises, Inc., Burbank, CA (US)

(72) Inventors: Justin Ali Kennedy, Norwell, MA (US); Kevin John Prince, Brooklyn, NY (US); Carlos Augusto Dietrich, Porto Alegre (BR); Dirk Van Dall, Shelter Island, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,095

(22) Filed: Oct. 24, 2022

(65) Prior Publication Data

US 2023/0039714 A1 Feb. 9, 2023

Related U.S. Application Data

(63) Continuation of application No. 17/084,211, filed on Oct. 29, 2020, now Pat. No. 11,514,677.

(51) Int. Cl.
*G06K 9/00* (2022.01)
*G06T 7/70* (2017.01)
*G06N 3/02* (2006.01)
*G06V 20/40* (2022.01)
*G06V 20/52* (2022.01)

(52) U.S. Cl.
CPC ............... *G06V 20/41* (2022.01); *G06N 3/02* (2013.01); *G06T 7/70* (2017.01); *G06V 20/53* (2022.01); *G06V 20/44* (2022.01)

(58) Field of Classification Search
CPC ........ G06V 20/41; G06V 20/53; G06V 20/44; G06T 7/70; G06N 3/02
See application file for complete search history.

(56) References Cited

U.S. PATENT DOCUMENTS

| 10,115,200 | B2 | 10/2018 | Sicking et al. | |
| 11,514,677 | B2 * | 11/2022 | Kennedy | G06N 3/045 |
| 2010/0027835 | A1 | 2/2010 | Zhang et al. | |
| 2019/0366153 | A1 | 12/2019 | Zhang et al. | |
| 2021/0073524 | A1 * | 3/2021 | Boyer | G06V 10/62 |
| 2021/0312183 | A1 * | 10/2021 | Bendre | G06V 10/764 |

* cited by examiner

*Primary Examiner* — David F Dunphy
(74) *Attorney, Agent, or Firm* — Farjami & Farjami LLP

(57) ABSTRACT

Systems and methods are presented for detecting physical contacts effectuated by actions performed by an entity participating in an event. An action, performed by the entity, is detected based on a sequence of pose data associated with the entity's performance in the event. A contact with another entity in the event is detected based on data associated with the detected action. The action and the contact detections are employed by neural-network based detectors.

26 Claims, 7 Drawing Sheets

100

300

600

700

DETECTION OF CONTACTS AMONG EVENT PARTICIPANTS

The present application is a Continuation of U.S. application Ser. No. 17/084,211, filed Oct. 29, 2020, which is hereby incorporated by reference in its entirety into the present application.

BACKGROUND

In the computer vision field, human action recognition has been attempted using three-dimensional skeleton data, but many challenges remain in developing practical systems that are able to reliably perform such action recognition. Real-time automatic detection of actions from video is a complex problem, both in terms of accuracy and speed. For example, existing methods in computer vision may be capable of addressing the problem of classification, but are ill-suited for the problem of action detection in real-time settings, such as detecting actions during live events or making other real-time observations from live video feeds.

Detection of contacts effectuated by an entity participating (a participant) in an event captured by a live video is one example of a current human action recognition problem. This problem is complicated by the high motion in which the participant moves and by self-occlusion or occlusions by other participants. Current systems and methods may not be capable of real time analyses of spatiotemporal video and extraction of three-dimensional data therefrom to facilitate real time detection of contacts and other action recognitions among participants during live events.

DETAILED DESCRIPTION

Figure 1:
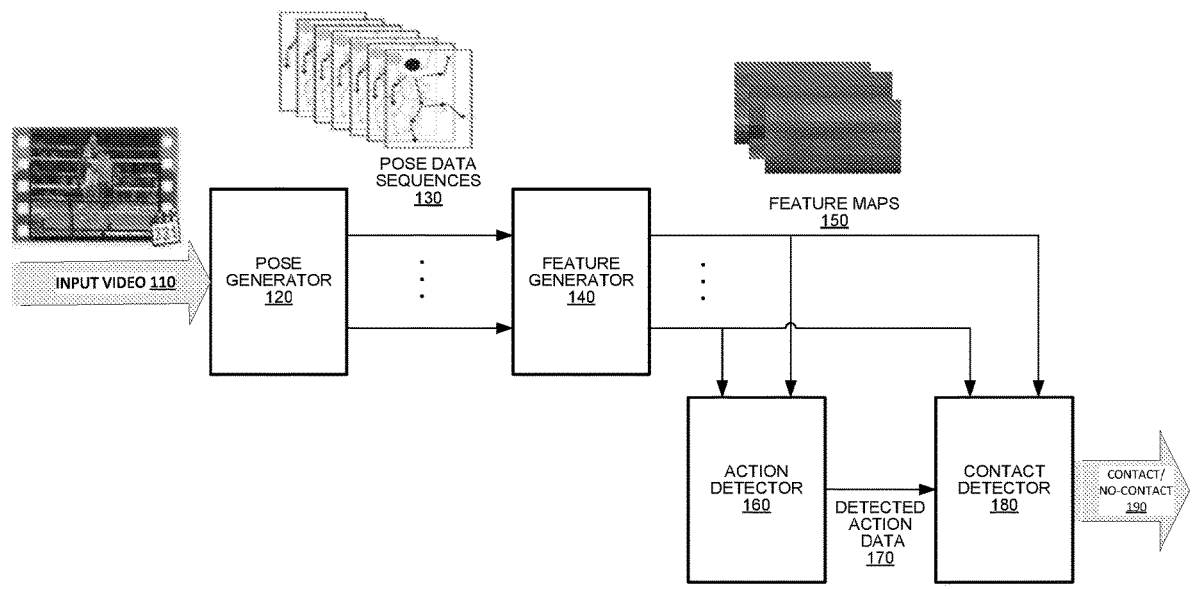
FIG. 1 illustrates a system for contact detection, according to an aspect of the present disclosure.

Systems and methods are disclosed for detecting the occurrence of a physical contact among participants performing in an event. The detection of physical contacts between participants of live events and their characterization can reveal meaningful insights about the performance of the participants and the development of the event. In a boxing match, for example, a play action, such as a jab, a cross, an uppercut, or a hook, may involve a physical contact when a player's body carrying out the action reaches the body of his opponent. By detecting a contact and analyzing its nature, the contact may be characterized (e.g., the contact location on the opponent's body and the energy exerted by the contact). How often a player makes contacts with his opponent and characteristics of these contacts may provide play measures that can be used to assess the playing style and performance level of the player as the game progresses.

For purposes of illustration only, aspects disclosed in the present disclosure are described with respect to a boxing match, however, aspects disclosed herein are not so limited. The methods and systems described below are applicable to other sports, arts, and events, wherein participants of the sports, arts, or events may perform an action (or may undergo a movement) that may result in a contact (or an attempted contact) with each other or with an object that may be of interest when analyzing the participants' performance or the development of the event. Furthermore, a "participant," as disclosed herein, may be an animate or inanimate entity, such as a person, an object, an animal, or a machine, and, a participant's "performance" may be the participant's movement during the event, whether the movement is powered by the participant itself or by an external force (e.g., from another entity). Thus, methods and systems described herein are applicable to detecting contact between participants, wherein one or more of the participants may be a human, an object, or a combination thereof. For example, a participating object may be a game object (e.g., a baseball bat or a hockey stick) or an articulated object (e.g., a robot or an animal) that is present or taking part in the event.

Systems and methods are described herein for detecting physical contacts effectuated by actions performed by an entity participating (a participant) in an event. Techniques described herein may receive a sequence of pose data, containing positional data of the participant, performing in the event. An action, performed by the participant, may be detected based on the sequence of pose data. Then, it may be detected, based on data associated with the detected action, whether a contact with another participant in the event had occurred. The detecting of the action may comprise: extracting a segment of pose data from the sequence of pose data; generating a set of one or more feature maps, derived from the segment; and, then, detecting the action based on the generated feature map set, employing a neural-network-based action detector. The detecting of a contact may comprise detecting based on the feature map set, employing a neural-network-based contact detector. In an aspect, the detecting of a contact may comprise augmenting the feature map set or reordering features in the feature map set, based on data associated with the detected action.

FIG. 1 illustrates a system for contact detection, according to an aspect of the present disclosure. The system 100 may comprise a pose generator 120, a feature generator 140, an action detector 160, and a contact detector 180. The pose generator 120 may receive, as an input, one or more video streams 110 that may be captured by a camera system, comprising multiple video cameras located at a scene of a sporting event. The pose generator 120 may output one or more sequences of pose data 130, each corresponding to a player's (or other participant's) movements while performing (or while being present) at the scene of the sporting event. The feature generator 140 may extract segments from each player's associated pose data sequence 130, extracted according to a sliding temporal window. The feature generator 140 may then generate feature maps 150 out of the extracted segments. In an aspect, a feature map 150 may be derived from temporally corresponding segments associated with multiple players or, in another aspect, a feature map 150 may be derived from a segment associated with one player. Based on the received feature maps 150, the action detector 160 may operate to detect an action of interest that occurred during a time duration corresponding to the extracted segment. Feature maps 150 and data associated with the detected action 170 may be fed to the contact detector 180. The contact detector 180 may then be employed to detect whether a physical contact (or an attempted contact) has been made by a player that carried out the detected action—outputting a binary decision 190 that either a "contact" or "no-contact" has been made by a respective player.

Figure 2:
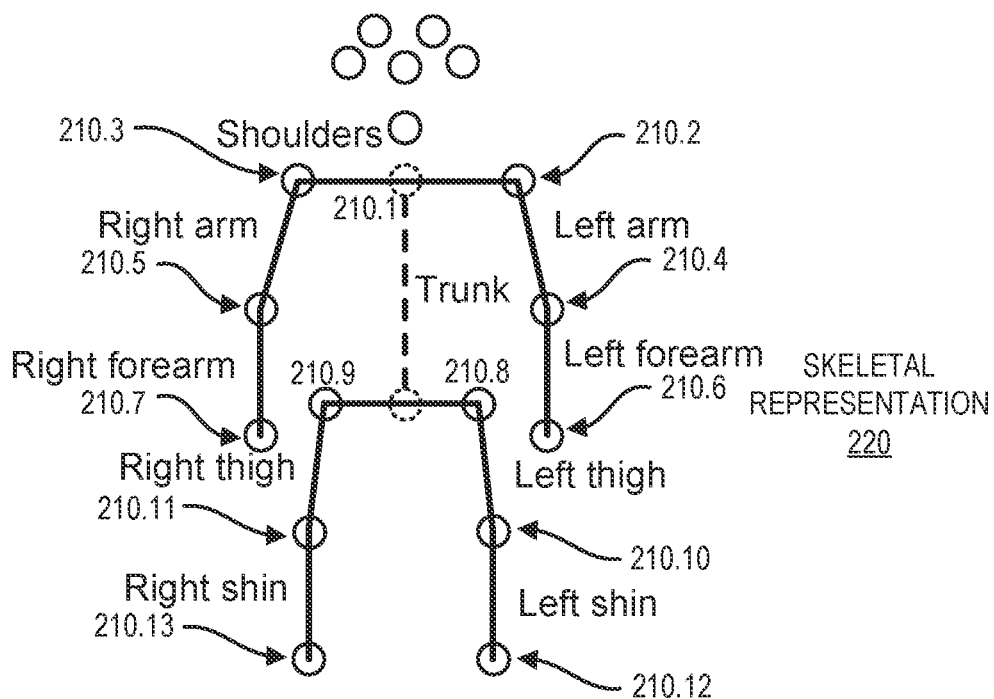
FIG. 2 illustrates pose data, according to an aspect of the present disclosure.
Figure 2:
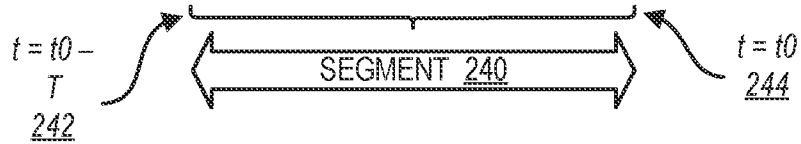

In an aspect, one or more video streams 110, capturing a live sporting event, may be fed to and buffered by the pose generator 120. The pose generator may employ techniques for extracting pose data from frames of the video streams 110 and may output a sequence of the pose data 130. FIG. 2 illustrates pose data, according to an aspect of the present disclosure. A pose data sequence 130 may comprise positional data of a skeletal trajectory—key points associated with a skeletal representation 220 of a performing player across time. As illustrated in FIG. 2, key points may correspond to body joints 210.1-210.13 that connect bone sections, such as, the left/right shoulder, the left/right arm, the left/right forearm, the trunk, the hips, the left/right thigh, and the left/right shin. For example, body joints, used as key points, may be the left/right shoulder 210.2/210.3, the left/right elbow 210.4/210.5, the left/right wrist 210.6/210.7, the left/right hip 210.8/210.9, the left/right knee 210.10/201.11, and the left/right ankle 210.12/201.13. It is to be understood, however, that key points do not necessarily need to be joints and could be comprised of other points associated with a person or object that are trackable over time in 3D space to indicate movements and may have known set of linkages and structure. In an aspect, where a contact with an object (either present at, moving during, or held by a participant of an event) is to be detected, key points may correspond to locations at the object, such as the object's body joints. For example, key points disclosed herein may be joints that connect sections of an articulated object (e.g., a robot or an animal). In another example, key points may represent transformation (e.g., scale, rotation, or translation) invariant points on the surface of an object. Therefore, embodiments of the invention can apply to other domains besides contact sports and even domains that are not related to human motion. In other words, contact can be between any observed entities, such as objects that have some sort of known relationship or linkage.

The three dimensional (3D) positions of key-points of a performing player (or a moving object) at the scene may be computed in real time using sensor-based techniques, vision-based techniques, or a combination thereof. Where sensor-based techniques may be utilized, a real world 3D location of a key point may be computed by a real time localization system (RTLS). In this case, a 3D location of a key point may be derived based on triangulation of data measured from a transceiver (e.g., attached to a joint 210) and readers, for example. Where vision-based techniques may be utilized, one or more cameras of a camera system may be positioned at the scene of a live sporting event. The cameras may be calibrated to allow for association of a real-world 3D location of a key point to its image projection, i.e., the respective two dimensional (2D) pixel locations on the video frames. Typically, image recognition methods may be employed to identify an image region of a key point (e.g., a joint), and, then, the 3D location of the identified key point may be computed based on the camera's calibration data.

As illustrated in FIG. 2, a pose data sequence 230, generated across time, may comprise a series of 3D positional points associated with key points 210 of a player. A positional point is denoted herein by $P_j(t)$, wherein P represents the 3D vector location of a joint j at a time t. In an aspect, $P_j(t)$ is an (x, y, z) vector in a Cartesian coordinate system defined relative to the scene. The time t and the rate at which the 3D position of a key point, $P_j(t)$, is computed may correspond to the time and the rate in which video frames 110 may be fed into the system 100. For example, a pose data sequence may provide 90 positional data points for each joint 210 each second, generated from a video with a frame rate of 90 frames per second.

Upon receiving pose data sequences 130, corresponding to a live video 110 coverage of a sporting event, the feature generator 140 may generate feature maps therefrom 150 to be used by the action detector 160 to detect the occurrence of an action of interest and by the contact detector 180 to detect the occurrence of a physical contact that may be effectuated by the detected action of interest. In an aspect, the feature generator 140 may extract segments of pose data 240 out of a pose data sequence 130 that correspond to a player. As illustrated in FIG. 2, an extracted segment 240 may extend between a current time to and a previous time $t_0$-T. The feature generator may generate feature data, out of the segment's positional data, that may be organized into one or more feature maps 150. In an aspect, a feature map may be an image of height and of width that correspond to a player's joints and their time trajectory, respectively. Each pixel of that image may represent a feature vector or a feature element (e.g., a joint position), where each dimension of the feature vector may be represented in a respective channel of the image (akin to the red, green, and blue channels of a color image), as explained further below.

The action detector 160 and the contact detector 180 may be employed to detect actions and respective contacts. These detectors may receive as an input sets of feature maps 150, each set of feature maps may be derived from a segment during which an action may be performed by a respective player. Accordingly, with respect to a feature map set, the action detector 160 may provide as an output data associated with a detected action 170—e.g., indicating the occurrence of an action, the occurred action's class, and any other metadata associated with the detected action (such as data associated with related objects or events). The contact detector 180 may provide a binary output 190, determining whether a detected action carried out by a respective player resulted in a physical contact (or an attempted contact) with the player's opponent. The action detector 160, the contact detector 180, or both may employ aspects of a detection system 600 that comprises components 620, 640, 660, and 680; each component may include one or more convolutional neural networks (CNNs), architecturally connected, as explained below with reference to FIG. 6.

In an aspect, the contact detector 180 may determine where there is enough movement of key points of two participants (two persons, two objects, or one person and one object) to indicate whether a contact has been made. To estimate contact, the contact detector 180 may use the coordinate change of the key points being tracked over a temporal segment, the speed of the coordinate changes, and the relative changes of these variables between different key points (e.g., change of hip coordinate vs change in knee coordinate).

An example of a sport in which an action detector 160 and a contact detector 180 may be employed to detect actions and respective contacts is boxing, where one participant is trying to punch another. In this case, the punch can be either a hit or a miss. In the case of a miss, the participant on the other end of the punch may have tried to dodge it. In some embodiments, the system 100 may disambiguate between 'dodges' and real contact by examining the coordinate changes (e.g., velocity or acceleration) of the key points being tracked before and after a possible point of contact. For instance, a participant's neck motion when dodging a punch may be less of a fluid motion than when a punch is landed. Alternatively, the system 100 may detect that a participant's right leg had a certain movement pattern before, during, or after a contact. Distance measures may also be used in the determination, however, using distance measures alone for determining contact may provide noisy results. Embodiments of the invention may estimate contact accurately without having to track a large number of key points.

A detection that a contact had occurred may facilitate further processing of data associated with the corresponding segment. For example, further processing may characterize the contact, may visualize it, or may record related data for later processing. Although, actions, detected by the action detector 160 may facilitate the detection of a contact, detected by the contact detector 180, aspects disclosed herein may further process detected actions, regardless whether a respective contact has been detected, or may process detected actions to indicate specifically when a contact has not been made (e.g., to indicate that one participant has not touched another or that a participant has not touched an object). For example, an action, detected as disclosed herein, may be used to automatically detect a region of interest within the video covering the acting participant (e.g., player). In turn, highlights (e.g., graphics or text) may be inserted relative to the region of interest. In other embodiments, output data may be used to make predictions or model alternate scenarios. For example, in a situation where contact was not made, output data may be used in a system to predict what would have happened if contact had been made (e.g., estimating what the force would have been, or where tracked key points would have moved if a punch that missed had actually landed).

In an aspect, analyses of the detected contact may be in the context of the detected action through which the contact has been made. A power statistic may be computed from pose data at the temporal vicinity of the contact, quantifying the energy exerted by the acting player based on linear kinetic energy that has been generated by the acting player's movements. Statistics derived from pose data leading to a detected contact may be computed and may incorporate previously computed statistics from the same player, from the player's opponent, or both. Similarly, the computed statistics may incorporate statistics generated from other games with respect to the same player, other players, or both. Analyses derived from players' detected contacts may be displayed to a viewer of the game on the viewer's primary display (e.g., TV screen) or a secondary display (e.g., mobile device). Analyses and statistics described herein with respect to detected contacts, may also be computed in cases wherein a player's movement (a play action) had not resulted in a physical contact with the opponent (e.g., an attempt to contact the opponent's body during the performance of a play action).

Figure 3:
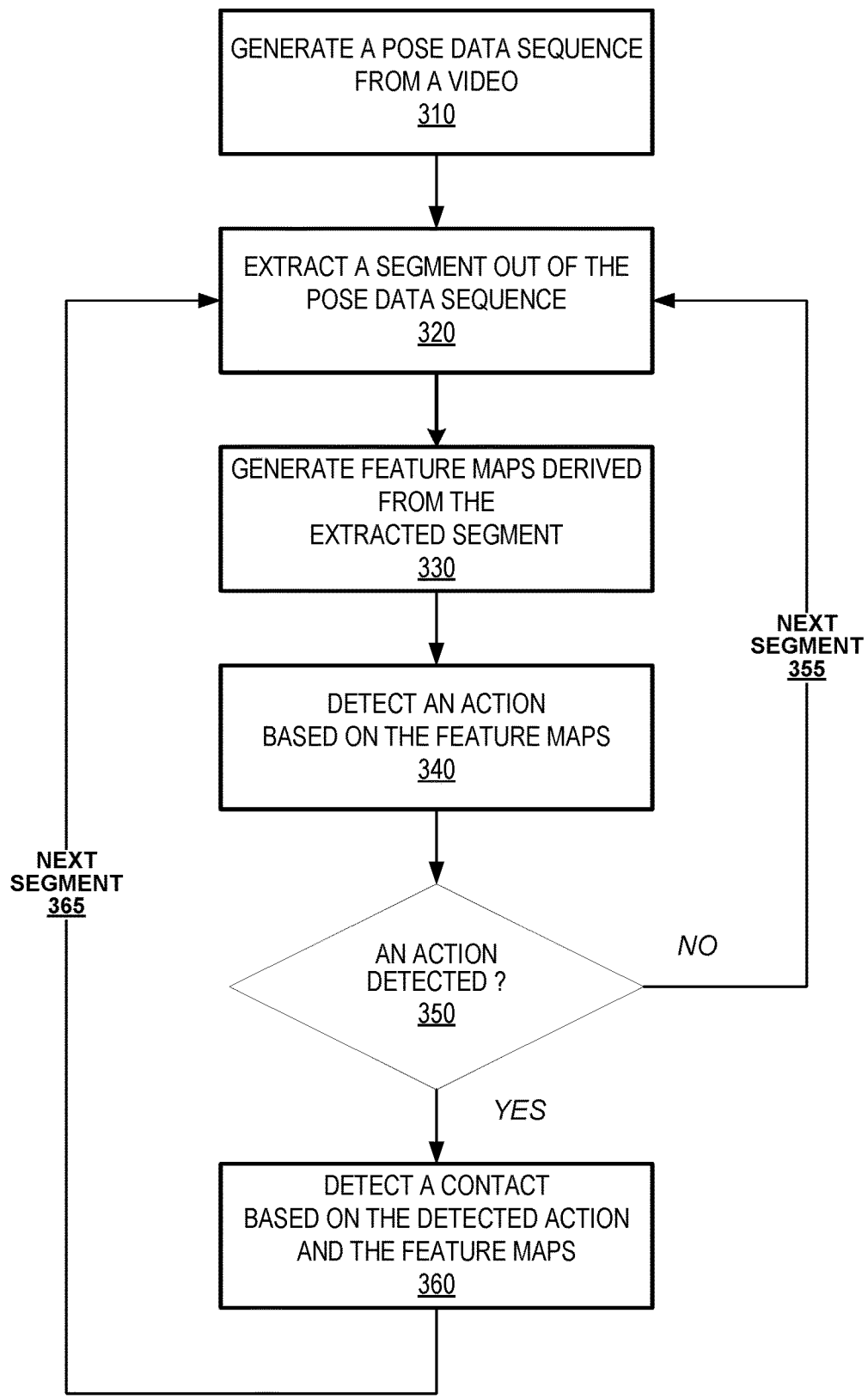
FIG. 3 illustrates a method for contact detection, according to an aspect of the present disclosure.

FIG. 3 illustrates a method for contact detection, according to an aspect of the present disclosure. The method 300 is described with reference to FIG. 4 that illustrates a feature map that is associated with a segment of pose data. The method 300 may begin 310 with generating, e.g., in real time, a pose data sequence 430, associated with a player performing in a live game. In step 320, a segment of pose data 440 may be extracted from the sequence of pose data 430, wherein extraction may be within a sliding window, typically ranging between a current time and a previous time. In step 330, feature maps may be generated based on the extracted segment 440. In step 340, the occurrence of an action, performed by a player whose pose data is represented in the extracted segment, may be detected, based on the generated 330 feature maps, using an action detector 160. If no action is detected with respect to the extracted segment 350, a next segment 355 may be extracted from the pose data sequence 320. If an action is detected 350, in step 360, the occurrence of a contact—e.g., a contact made with the opponent's body by the player performing the detected action—may be detected, based on data associated with the detected action 340 and based on the generated feature maps 330 using a contact detector 180. The detection of a contact 360 may comprise making a binary decision that either a contact has been made or no contact has been made. Following the contact detection of step 360, the method 300 may continue with the processing of the next segment 365.

In step 310, generating a pose data sequence 430 may comprise computing a trajectory of 3D positions of joints, 410.1-J, of a player body, e.g., a sequence of positional data $P_j(t)$ may be computed for a joint j at points in time t associated with frames of the input video 110. In an aspect, more than one sequence of pose data 430 may be generated 310, each corresponding to one player of multiple players. For example, two corresponding sequences of pose data 430 may be generated out of the input video 110 with respect to two players in a boxing match, $P_{j,1}(t)$ and $P_{j,2}(t)$, and may be processed 300 independently or in a coupled manner (e.g., by concatenating feature data derived from $P_{j,1}(t)$ and $P_{j,2}(t)$). In another aspect, a sequence of pose data 430 may also include positional data of one or more objects present at the event (such as a boxing ring). For example, two corresponding sequences of pose data 430 may be generated out of the input video 110 with respect to a player $P_{j,1}(t)$ and an object $P_{Object}(t)$, and may be processed 300 in combination to detect a contact between the player and the object (e.g., by concatenating feature data derived from $P_{j,1}(t)$ and $P_{Object}(t)$). The generated one or more pose data sequences 310, as well as the input video 110, may be buffered to allow for further access and processing 300.

In step 320, a segment of pose data 440 may be extracted from a sequence of pose data 430. The segment 440, denoted herein as $S=S(t_0)$, may be extracted from the pose data sequence 430 at time to, within a time window between $t_0-T$ and $t_0$. Thus, the segment may comprise positional data of the skeletal trajectory of a performing player along a temporal duration T. The positional data of S may be expressed by the following T long series:

$$S=\{P_{S,j}(t)=(x_t,y_t,z_t)_j; j=[1,J] \text{ and } t=[t_0-T,t_0]\}, \quad (1)$$

where $(x_t, y_t, z_t)_j$ may denote a location vector of a key point j at a discrete time t within a range of $t_0-T$ 442 and $t_0$ 444. The $(x_t, y_t, z_t)_j$ location vector may be defined in a Cartesian coordinate system relative to the scene. In an aspect, the length T of the segment 440 may vary based on criteria such as the nature of the performance that is being analyzed (boxing or other sports) or based on the processing in steps 330-360 of previously extracted segments. In another aspect, multiple sliding windows may be applied—e.g., multiple segments may be extracted at time $t_0$, each with a different length T, so that actions with different temporal lengths may be captured within at least one of these segments. An alternative approach to applying multiple sliding windows, may be comprising identifying the start, the end, or the start and end of an action within a sliding window of a predetermined length.

Likewise, the rate in which segments 440 may be extracted may vary, e.g., a segment may be extracted at the same rate as the input frame rate or at a lower rate, depending on the nature of the performance that is being analyzed (boxing or other sports) or the processing in steps 330-360 of previously extracted segments. In an aspect, the extraction of a segment from the pose data sequence may be performed at a stride that is determined based on a detected action from a previously extracted segment or based on other real time information or events. For example, if no action has been detected 350 based on the processing of one or more successive segments or a game event occurred, the frequency in which upcoming segments are to be extracted may be decreased or may be changed.

Figure 4:
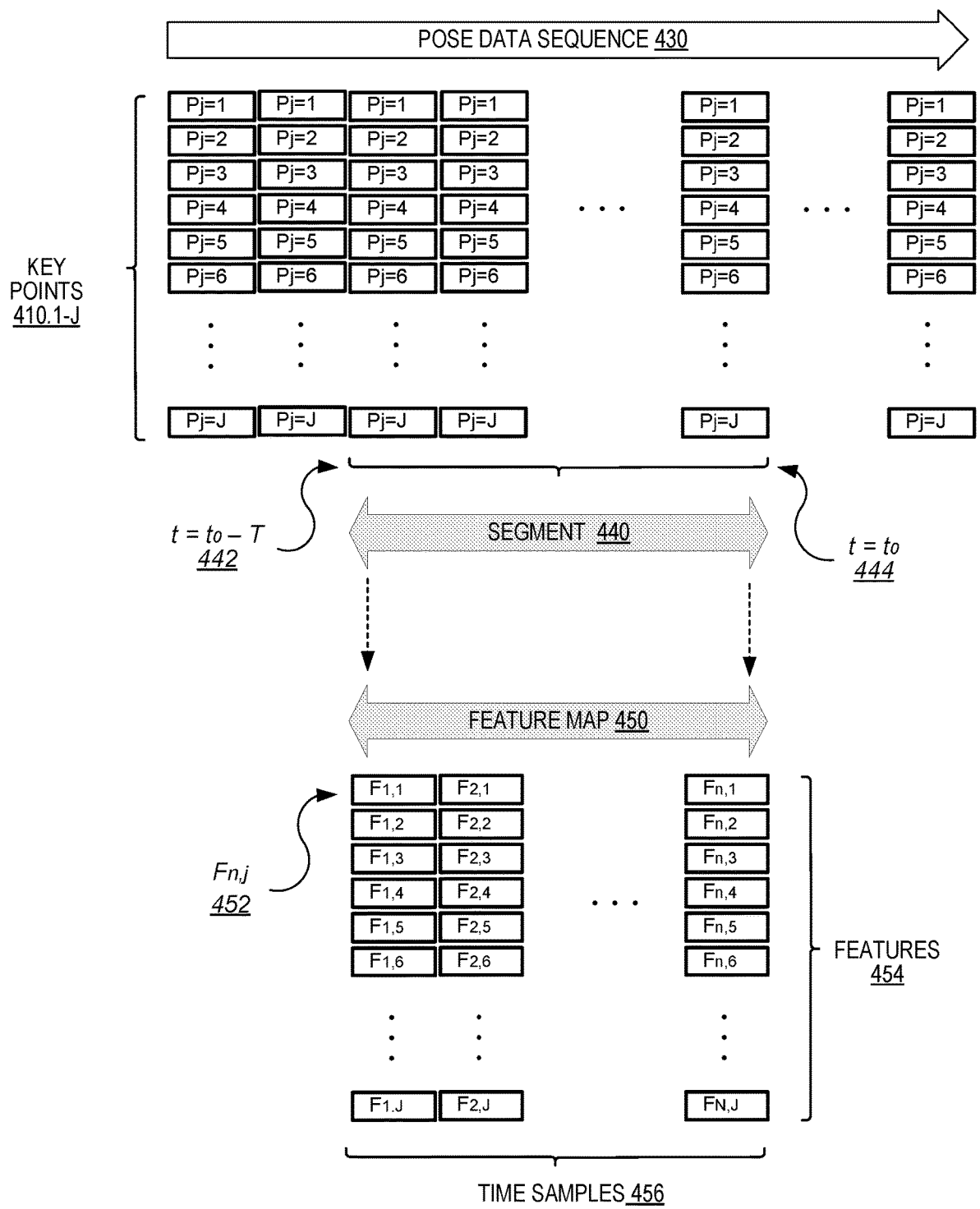
FIG. 4 illustrates a feature map, associated with a segment of pose data, according to an aspect of the present disclosure.

Once a segment 440 is extracted 320, feature maps may be derived from the extracted segment, in step 330. FIG. 4 illustrates a feature map data structure 450 that may be derived from positional data of a respective segment 440. As shown in FIG. 4, in an aspect, features may be constructed into an image—namely a feature map—of height J, of width N, and of K channels, such as the red, green, and blue (RGB) channels of a color image. Where J may be the number of features 454 that may be derived from J respective key points (joints of a skeletal representation) at a time sample n, out of N number of time samples 456 (samples within the sliding window: $t_0$-T 442 and to 444). Each feature, e.g., $F_{n,j}$ 452, may be a vector, where each vector's dimension may be represented in one channel of the feature map. For example, a feature map may comprise the positional data of the respective segment $S(t_0)$, as follows:

$$F_p = F_p(t_0) = \{F_p(n,j) = (x,y,z)_{n,j} : j=[1,J] \text{ and } n=[1,N]\}, \quad (2)$$

where $(x, y, z)_{n,j}$ may denote a location vector of a key point j at a discrete time t (between $t_0$ and $t_0$-T) that is indexed by n. Thus, in an aspect, with respect to an extracted 320 segment $S(t_0)$, feature data, generated in step 330, may be constructed as an RGB image of height J, width N, a red channel containing the x dimension of the location vectors, a green channel containing the y dimension of the location vectors, and a blue channel containing the z dimension of the location vectors.

Figure 5:
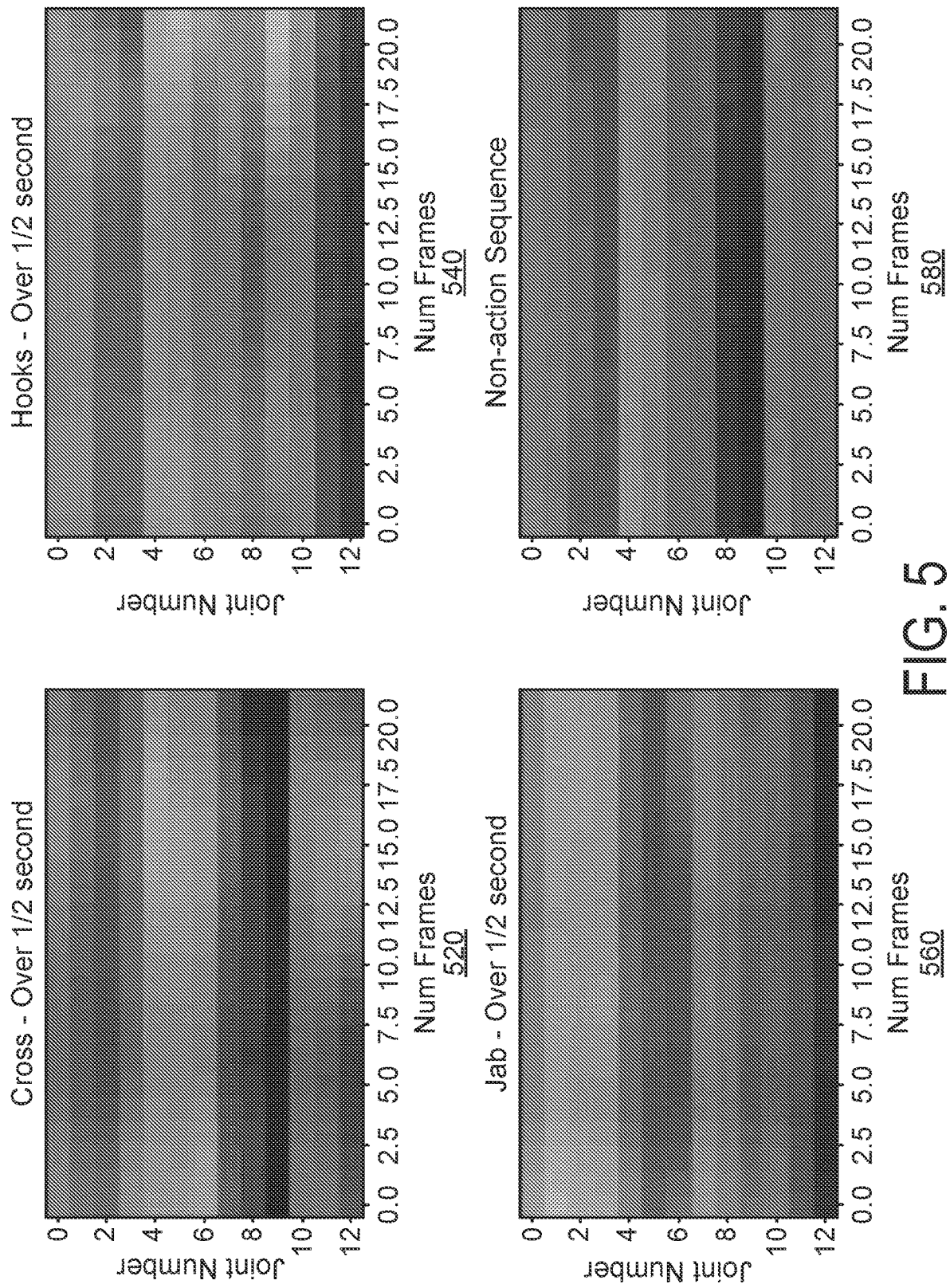
FIG. 5 illustrates feature maps, according to an aspect of the present disclosure.

FIG. 5 illustrates feature maps, according to an aspect of the present disclosure. The feature maps, shown in FIG. 5, are derived from the positional data of a respective segment $S(t_0)$ as defined in equation (2). For example, feature map 520 demonstrates feature data that are derived from a segment S, containing pose data that capture a cross action, carried out by a player during a time between $t_0$-T and $t_0$, where T is 0.5 second long. The vertical axis represents the joints, e.g., 210.1-210.13. The horizontal axis represents frames, each frame provides a sample of a joint's position within $t_0$-T and $t_0$. Thus, each pixel of feature map 520 represents a 3D value, including the red, the green, and the blue components that, respectively, correspond to the x, y, and z dimensions of a respective joint's position. Similarly, feature maps 540, 560, and 580, demonstrate respective feature data that are derived from respective segments, containing pose data that capture a hook action, a jab action, and a non-action, respectively.

In an aspect, a set of feature maps, denoted herein as $\{F_m: m=1:M\}$, may be generated in step 330 based on the extracted segment of step 320. For example, the velocity in which each joint is moving may be used as a feature, as follows:

$$F_v = F_v(t_0) = \{F_v(n,j) = (v_x, v_y, v_z)_{n,j} : j=[1,J] \text{ and } n=[1,N]\}, \quad (3)$$

where $(v_x, v_y, v_z)_{n,j}$ may denote a velocity vector of a key point j at a discrete time t (between $t_0$ and $t_0$-T) that is indexed by n. In an aspect, $F_v(n,j)$ may be computed as the difference between $F_p(n,j)$ and $F_p(n-1,j)$, defined in equation (1), where $F_p(n,j)$ may indicate positional data of a joint j at time t indexed by n and $F_p(n-1,j)$ may indicate positional data of the joint j at a previous time t indexed by n-1. Similarly, feature data representing velocities of joints may be constructed as an RGB image of height J, width N, a red channel containing the x dimension of the velocity vectors, $v_x$, a green channel containing the y dimension of the velocity vectors, $v_y$, and a blue channel containing the z dimension of the velocity vectors, $v_z$.

Other features may be extracted from the positional data of a segment 440. For example, the angle between sections (e.g., bone sections) connected by a joint j may be used as a feature with respect to that joint. Thus, for example, an angle feature that may be associated with a knee (e.g., joint 210.10 of FIG. 2) may be the angular difference between the respective thigh and shin bone sections. Thus, the angle feature between two connected sections may be defined as a three dimensional angle (vector), as follows:

$$F_a = F_a(t_0) = \{F_a(n,j) = (\alpha,\beta,\gamma)_{n,j} : j=[1,J] \text{ and } n=[1,N]\}, \quad (4)$$

where $(\alpha, \beta, \gamma)_{n,j}$ may denote an angle vector in a spherical coordinate system defined with respect to a key point j at a discrete time t (between $t_0$-T and $t_0$) that is indexed by n. An angle vector $(\alpha, \beta, \gamma)_{n,j}$ may represent the angular difference between sections, connected by the key point j, in the spherical coordinate system. Feature data representing angles between sections connected by joints may also be constructed as an RGB image of height J, width N, a red channel containing the $\alpha$ elements, a green channel containing the $\beta$ elements, and a blue channel containing the $\gamma$ elements. In an aspect, an angle feature may be defined as a planar angle (scalar), $\alpha_{n,j}$, measuring the angle between two sections in the planar space formed by these sections. In this case, the respective feature map may comprise one channel containing planar angles, that is $F_a = F_a(t_0) = \{F_a(n,j) = \alpha_{n,j} : j=[1, J] \text{ and } n=[1, N]\}$.

Another example for feature data may be related to the orientation of a section (e.g., bone section), as follows:

$$F_b = F_{b1}(t_0) = \{F_{b1}(n,j) = (x,y,z)_{n,j} - (x,y,z)_{n',j'} : j=[1,J] \text{ and } n=[1,N]\}, \quad (5)$$

where $(x, y, z)_{n,j}$ may denote a location vector of a joint j at a discrete time t (e.g., between $t_0$ and $t_0$-T) that is indexed by n, and $(x, y, z)_{n', j'}$ may denote a location vector of a joint j' that is adjacent to joint j and at a discrete time that is previous to time t that is indexed by n'. Yet, another variation for a feature that measure a section (e.g. bone section) orientation may be define as follows:

$$F_b = F_{b2}(t_0) = \{F_{b2}(n,j) = (x,y,z)_{n,j} - (x,y,z)_{n,j'} : j=[1,J] \text{ and } n=[1,N]\}, \quad (6)$$

where $(x, y, z)_{n,j}$ and $(x, y, z)_{n,j'}$ may denote a location vector of a joint j and a joint j' that is adjacent to joint j, respectively, at a discrete time t that is indexed by n.

Yet other features, namely distance features, $F_d$, may be extracted from the positional data of a segment 440. In an aspect a distance feature $F_d$ may represent a distance between a player's joint j and another joint from a subset of the same player's joints. In another aspect, a distance feature $F_d$ may represent a distance between a player's joint j and another joint from a subset of another player's joints. In both cases, each joint j may be associated with an array of distances, $F_d = F^{l=1}_d, \ldots, F^{l=L}_d$, wherein each element $F^l_d$ may represent a distance between that joint and another joint from a subject of joints of the same player or another player. Alternatively, a distance feature $F_d$, associated with a player's joint j, may be defined as the distance between that joint and a location derived from a subset of joints of the same player or of another player. For example, the derived location may be the centroid of the joints in the subset (e.g., their average 3D location at the scene).

In an aspect, pose data of segments may be spatially normalized, in step 330, before feature maps, e.g., $F_p$, $F_v$, $F_a$, $F_b$, or $F_d$ may be computed as described herein. To that end, pose data across segments may be spatially aligned to compensate for differences in dimension, orientation, and translation. A rigid transformation may be applied to pose data of segments that may be processed by the system 100 to have these segments spatially aligned with a reference segment. For example, the hip joints 210.8-9 may be spatially aligned across segments. Likewise, corresponding sections (e.g., bone sections) may be scaled into a consistent length. Following spatial normalization, features map, e.g., $F_p$, $F_v$, $F_a$, $F_b$, or $F_d$ may be computed as described herein. In a further aspect, the values of feature maps' elements may be scaled—that is, the value of each element of a feature map, $F_{n,j}$ 452, may be scaled into a value within a predefined range, such as a range of 0 and 255 or a range of 0 and 1.

In another aspect, normalization may be applied directly to the feature maps to compensate for variations in translation and scale. For example, assuming a feature map F with K channels; wherein $F^{n,j,k}$ may denote a feature map's element, where n may index a discrete time t, j may denote a joint, and k may denote a channel (each channel storing one dimension of the feature map's elements). Thus, the normalization of a feature map associated with a segment S may be as follows:

$$\hat{F}^{n,j,k} = \frac{F^{n,j,k} - f_{min}^{n,k}}{\max_k (f_{max}^{n,k} - f_{min}^{n,k})}, \qquad (7)$$

Wherein: $f_{min}^{n,k}$ may be the minimum feature value among all feature values derived from joints' locations corresponding to the $n^{th}$ time step in segment S, in a channel k; $f_{max}^{n,k}$ may be the maximum feature value among all feature values derived from joints' locations corresponding to the $n^{th}$ time step in segment S, in a channel k; and $$\max_k (\cdot)$$

is the maximum of $(f_{max}^{n,k} - f_{min}^{n,k})$ over all channels K. In a further aspect, the normalized feature map elements, $\hat{F}^{n,j,k}$ may be further scaled into a value within a predefined range, such as a range of 0 and 255 or a range of 0 and 1.

Once a feature map set $\{F_m: m=1:M\}$ may be generated and may be normalized, the feature maps may be used to detect actions of interest (such as a jab in a boxing match), in step 340, and may be used to detect contacts effectuated by the detected actions of interest, in step 360. In an aspect, detections of actions and contacts may be performed by a CNN-based detector, as explained with reference to FIG. 6. CNNs are useful in learning patterns from features provided to them in a spatiotemporal format (feature maps), as those illustrated in FIG. 5. Generally, a CNN may employ convolution operations, using kernels, across several layers. Convolutional kernels applied in earlier layers in the network may integrate information from neighboring features more efficiently than convolutional kernels applied in later layers in the network. Therefore, correlations among features closely positioned in the feature map may be better learned. As further explained below with respect to co-occurrence networks 640, the ordering of joints from which respective feature maps are derived may affect the learning and inference efficiency of a detection system 600, as earlier layers in a convolutional network may identify local features between adjacent joints while later layers in the network may then identify patterns in the identified local feature patterns. Thus, the ordering of joints may be important as it may determine what information local patterns and global patterns may be derived from.

A CNN-based action detector 160 may be trained to detect the classes of actions to be detected, e.g., learning from training sets of feature maps. If no action of interest has been detected 340, based on the feature maps derived from the extracted segment 320, a next segment 355 may be extracted in step 320. If an action of interest has been detected 340, in step 360, the occurrence of a contact may be detected, based on the feature maps 150 and based on data associated with the detected action 170, by a CNN-based contact detector 180. The CNN-based contact detector 180 may be trained to detect whether a physical contact has been made during the performance of an action of interest, e.g., learning from training sets of feature maps. A detection that a contact has been made may lead to further processing of data associated with the contact and the respective detected action. Following contact detection 360 with respect to the extracted segment 320, the method may proceed to extract and process the next segment 365.

Training sets of feature maps may be generated by the feature generator 140 of the system 100 out of recorded pose data sequences or out of pose data sequences that may be generated from live video 110, e.g., by the pose generator 120. Training sets of feature maps may comprise example pairs, where each set of feature maps $\{F_m: m=1:M\}$ may be paired with a corresponding class of action of interest (e.g., a jab, a cross, an uppercut, or a hook) and a corresponding binary class (e.g., flagging a contact or a no-contact event). In an aspect, a CNN-based action detector 160 may be trained based on training feature map sets and respective action classes, each set of the training feature map sets is derived from a respective segment that was previously extracted from a pose data sequence. In a further aspect, a CNN-based contact detector 180 may be trained based on a modified version of the training feature map sets and respective binary classes, wherein the modification is based on the respective action classes.

Figure 6:
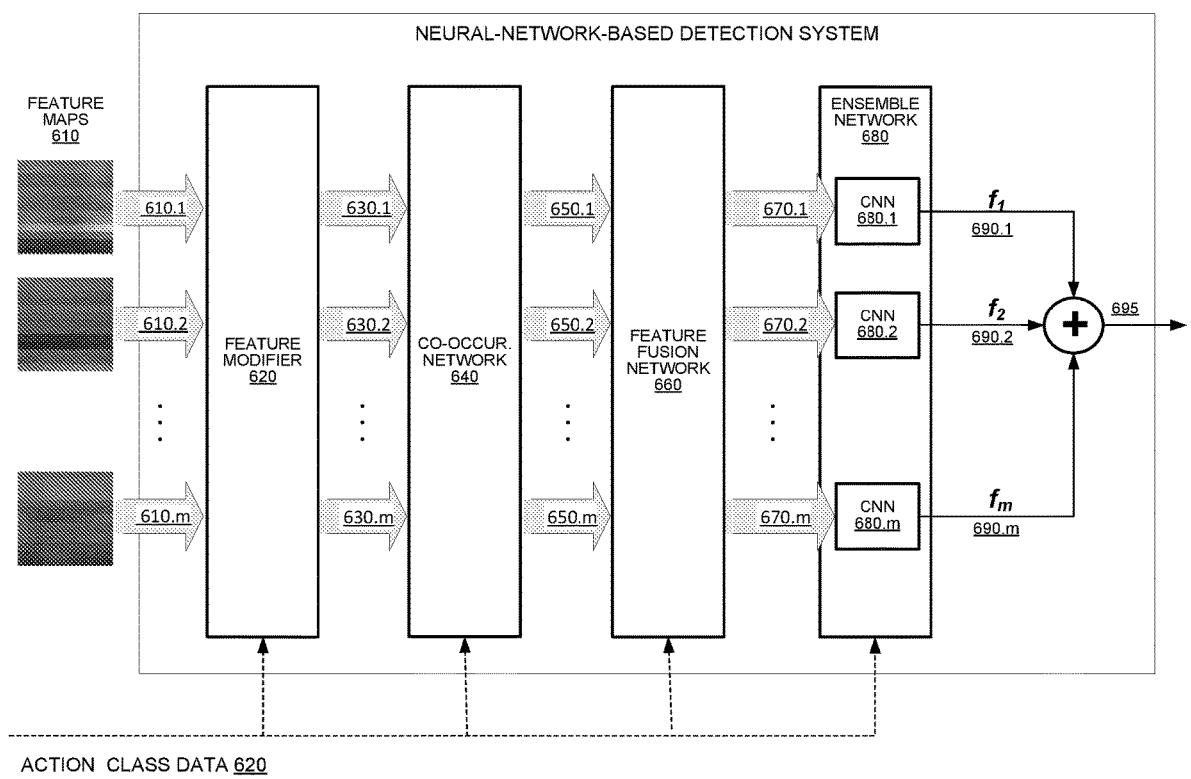
FIG. 6 is a block diagram of a neural-network-based detection system, according to an aspect of the present disclosure.

FIG. 6 is a block diagram of a neural-network-based detection system 600, according to an aspect of the present disclosure. System 600 may comprise a feature modifier 620, a co-occurrence network 640, a feature fusion network 660, and an ensemble network 680. The feature modifier 620, the co-occurrence network 640, the feature fusion network 660, and the ensemble network 680 of system 600 may each comprise one or more CNNs and may each be employed for training the CNNs as well as for real time operations. Aspects of the system 600 may be applied for detecting actions 160 and for detecting contacts 180. However, when the system 600 is applied to detect contacts 180, data associated with classes of action of interest 620 may be used to alter the feature maps or the structure or other parameters of the system 600.

The feature modifier 620 may receive as an input a set of feature maps 610.1-m and may provide as an output modified feature maps 630.1-m. For example, the feature modifier may augment a feature map, e.g., 610.1, by creating out of it multiple feature maps, 630.1, each feature map, of the multiple feature maps, may correspond to a different view of the skeletal trajectory. The created feature maps 630.1 may be more discriminative, and, thereby, may improve the detection system capability to distinguish among the classes it designs to detect (e.g., action classes when used as an action detector 160 or contact/no-contact events when used as a contact detector 180). In an aspect, a number of Q feature maps 630.1 may be created by spatially rotating a feature map 610.1 according to respective rotation matrixes, $\{R_q: q=1:Q\}$. For example, the rotation matrixes may be learned with fully connected Q network layers of a CNN, e.g., part of the feature modifier 620.

When system 600 is applied for contact detection, data associated with classes of actions of interest 620 may be used to augment a feature map—e.g., action class data 620 may be used in the learning of the rotation matrixes. In an aspect, data associated with an action class 620 may be used directly to determine the number of rotations Q, the rotation matrixes themselves, or both. For example, it may be known that for a certain action, one or more specific views may result in feature maps that are more discriminative in detecting a contact.

The co-occurrence network 640 may be applied to learn (during training) and then exploit (during operation) key points' (joints') co-occurrences—i.e., correlations between joints. Typically, a certain action may be better characterized by features derived from a subset of joints; thus correlations, or co-occurrence, among these features may be more discriminative with respect to that action. As described above, a feature map is structured so that each row represents temporal movements of one joint, and each channel of the feature map represents one coordinate of a feature—that is a tensor of J×N×K (the last dimension determines the channels number, in this case K). Applying convolution operations to such a tensor may result in local feature aggregation across the J×N image of each channel and global feature aggregation across channels. Thus, correlations among joints that are positioned within a neighborhood in the feature map may be learned better than correlations among joints that are positioned away from each other in the feature map. To circumvent this, the feature map tensor may be reordered so that the joint dimension J may be put into the feature map's channels—that is N×K×J. A convolution of such a tensor will allow global feature aggregation across all joints, and, thereby, will allow exploiting correlations among joints that may be discriminative with respect to the learned action classes Accordingly, in an aspect, the co-occurrence network 640 may apply successive convolution layers to a feature map at its input, e.g., 630.1. The feature map that is fed into each layer may be reordered into tensor J×N×K, tensor N×K×J, or tensor J×K×N. The last convolutional layer may provide the resultant feature map, e.g., 650.1, to the input of the feature fusion network 660.

When system 600 is applied for contact detection, data associated with classes of actions of interest 620 may be used to reorder features in a feature map, e.g., 630.1, thereby improving the learning of correlations between features that correspond to joints that are most relevant for the action. For example, it may be known that for a certain action, the trajectory of a subset of joints may be highly correlated. In such a case, for example, the rows of the feature maps 450 may be reordered so that features corresponding to that subset of joints will be close to each other.

The feature fusion network 660 may receive at its input a set of feature maps 650.1, 650.2, . . . , 650.$m$, that so far may be processed independently in the system 600. To leverage complementary characteristics of the different features— e.g., the positional features $F_p$, velocity features $F_v$, angle features $F_a$, section orientation features $F_b$, or distance features $F_d$—the feature fusion network may fuse a subset of these features, by concatenating the respective feature maps, and, then may apply convolutional operations to the fused feature maps. For example, in an aspect, pairs of feature maps, such as first pair $F_p$ and $F_v$, and second pair $F_p$ and $F_a$, may be fused together, for example by concatenating their respective tensors into J×N×2K tensor. Then, the concatenated tensors of the first and second pair may be fed into respective CNNs. At the output of the respective CNNs, corresponding elements from the tensors of the first and second pair may be combined, e.g., to result an output that conform to tensors of dimension J×N×K—that are feature maps 670.1-$m$. In an aspect, the output tensors may be of other dimensions, depending on the number of kernels and network levels used in each of the respective CNNs.

The ensemble network 680 may receive at its input feature maps 670.1-$m$. Each feature map, e.g., 670.1, may be fed to a CNN, 680.1, and may provide at the output a probability vector f, 690. Each element of the probability vector f may indicate the probability of a certain class given the respective feature map. For example, when system 600 is applied to action detection, $f_1$ 690.1 may indicate the probabilities of action classes given feature map 610.1. When system 600 is applied to contact detection, $f_1$ 690.1 may indicate the probability of the occurrence of a contact given feature map 610.1. The probabilities $f_1, f_2, \ldots, f_m$ may be used differently during the training of system 600 and during the real time operation of system 600. During training, the parameters of system 600 (e.g., parameters of CNNs therein) are optimized using a loss function $L_m$ for each feature map $F_m$. For example, $L_m$ may be defined as follows:

$$L_m = -\Sigma_{i=1}^{C} y_i \log(f_m(i)) \qquad (8)$$

where $y_i$ may indicate the a priori probability of class i out of C learned action classes (e.g., a probability of a certain action or a probability of the occurrence of a contact). During operation (inference), the probabilities $f_1, f_2, \ldots, f_m$ may be combined to result in an estimate for a class 695. For example, an estimate for a certain action i to be carried out by a player (based on the features derived from segment S) may be computed by maximizing the posterior probability— $P(i|f_1, f_2, \ldots, f_m)$ that is the probability that class i occurred given probability vectors $f_1, f_2, \ldots, f_m$.

Figure 7:
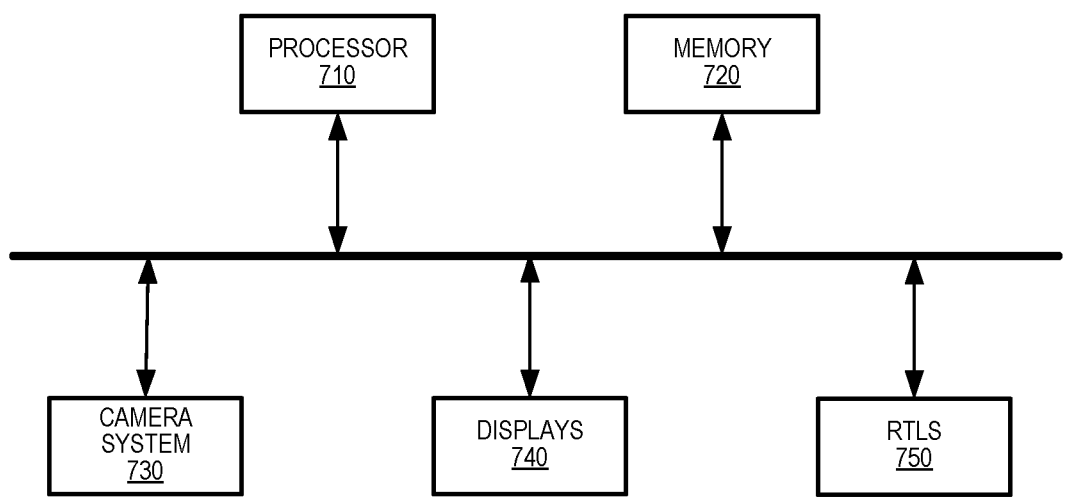
FIG. 7 is a simplified block diagram of a system, according to an aspect of the present disclosure.

FIG. 7 is a simplified block diagram of a system 700, according to an aspect of the present disclosure. The system 700 may comprise a processor 710, a memory 720, a camera system 730, displays 740, and an RTLS 750. The processor 710, the memory 720, the camera system 730, the displays 740, and the RTLS 750 may communicate with each other via communication links, including wired links, wireless links, or a combination thereof, and may be local or remote to each other. The operation of systems and methods, as illustrated in FIGS. 1-6, may be performed by the processor 710, executing program instructions run by an operating system stored in the memory 720. The program instructions and the operating system may be written in any programming language—such as C, Java, Objective-C, C++, Python, Visual Basic, Perl—or any other programming language capable of producing instructions that are capable of execution on the processor 710.

The processor 710 may include dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute an operating system and applications to perform the methods disclosed herein.

The memory 720 may be configured to store both programs and data. As indicated, the memory 720 may store instructions for an operating system and applications that perform methods according to aspects of the present disclosure in machine readable form. For example, the memory 720 may store: video data 110 captured by the system camera 730, pose data sequence 130 and feature maps 150 that may be generated by systems 100, disclosed herein. The memory 720 may also store system information, user information, and the like. The memory 720 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions or the events of a method, algorithm, or module may reside as one or any combination or set of codes or instructions on a memory 720 or other machine readable medium, which may be incorporated into a computer program product.

The camera system 730 may comprise static or dynamic cameras, each may be located at a site of a sporting event and each may be employed for capturing a live video of the event. The displays 740 may present to a user a representation of the event. The representation may comprise one or more videos captured by the camera system 730 that may be overlaid with content (e.g., graphics) derived from statistics generated from the sporting event. The RTLS 750 may operate in corporation with sensors, attached to subjects (e.g., players) participating in the event, to produce real time positional data of the subjects. For example, pose data may be generated based on transceivers attached to a subject's body. Alternatively, or in combination, subjects' pose data may be extracted from video content generated by the camera system 730.

The foregoing discussion has described operation of the foregoing embodiments in the context of system components, such as camera system 730, displays 740, and RTLS 750. Commonly, these components may execute programs that are stored in a local memory of those components and may be executed by local processors within them. Alternatively, they may be embodied in dedicated hardware components such as application specific integrated circuits, field programmable gate arrays or digital signal processors. And, of course, these components may be provided as hybrid systems that distribute functionality across dedicated hardware components and programmed general purpose processors, as desired.

Several aspects of the disclosure are specifically illustrated or described herein. However, it will be appreciated that modifications and variations of the disclosure are covered by the above teachings and within the purview of the appended claims without departing from the spirit and intended scope of the disclosure.

We claim:

1. A method comprising:
   receiving positional data associated with a performance of an entity;
   generating, using the positional data, one or more feature maps;
   training a neural-network-based action detector based on the one or more feature maps and respective action classes; and
   training a neural-network-based contact detector based on a modified version of the one or more feature maps and respective binary classes, wherein the modified version is based on the respective action classes.

2. The method of claim 1, wherein the one or more feature maps comprise feature data associated with a key point of the entity.

3. The method of claim 2, wherein the feature data associated with the key point includes at least one of a position of the key point, a velocity of the key point, or an angle between sections connected by the key point.

4. The method of claim 2, wherein the feature data associated with the key point includes at least one of a distance from the key point to a centroid location of key points of another entity, or a distance from the key point to the key points of the another entity.

5. The method of claim 2, wherein the feature data associated with the key point includes an orientation of a section connected to the key point.

6. The method of claim 2, wherein the key point is a joint.

7. The method of claim 1, further comprising:
   before generating the one or more feature maps, normalizing the positional data.

8. An apparatus comprising:
   a processor; and
   a memory storing instructions that, when executed by the processor, cause the apparatus to:
   receive positional data associated with a performance of an entity;
   generate, using the positional data, one or more feature maps;
   train a neural-network-based action detector based on the one or more feature maps and respective action classes; and
   train a neural-network-based contact detector based on a modified version of the one or more feature maps and respective binary classes, wherein the modified version is based on the respective action classes.

9. The apparatus of claim 8, wherein the one or more feature maps comprise feature data associated with a key point of the entity.

10. The apparatus of claim 9, wherein the feature data associated with the key point includes at least one of a position of the key point, a velocity of the key point, or an angle between sections connected by the key point.

11. The apparatus of claim 9, wherein the feature data associated with the key point includes at least one of a distance from the key point to a centroid location of key points of another entity, or a distance from the key point to the key points of the another entity.

12. The apparatus of claim 9, wherein the feature data associated with the key point includes an orientation of a section connected to the key point.

13. The apparatus of claim 9, wherein the key point is a joint.

14. The apparatus of claim 8, wherein the memory stores additional instructions that, when executed by the processor, cause the apparatus to:

before generating the one or more feature maps, normalize the positional data.

15. A method comprising:
receiving a sequence of positional data associated with a performance of an entity in an event;
extracting a segment of the positional data from the sequence of the positional data;
generating one or more feature maps derived from the segment of the positional data;
detecting, by employing a neural-network-based action detector using the one or more feature maps, an action performed by the entity; and
detecting, by employing a neural-network-based contact detector using the one or more feature maps, a contact between the entity and another entity in the event.

16. The method of claim 15, further comprising:
generating the sequence of the positional data based on an analysis of sensor data captured by one or more sensors positioned at a site of the event.

17. The method of claim 15, further comprising:
augmenting, based on data associated with the detected action, the one or more feature maps.

18. The method of claim 15, wherein the one or more feature maps comprise feature data associated with a key point of the entity, including at least one of a position of the key point, a velocity of the key point, an angle between sections connected by the key point, an orientation of a section connected to the key point, a distance from the key point to other key points of the entity, a distance from the key point to key points of another entity, or a distance from the key point to a centroid location of other key points of the entity.

19. The method of claim 18, wherein the key point is a joint.

20. The method of claim 15, further comprising:
before generating the one or more feature maps derived from the segment, normalizing the segment.

21. An apparatus comprising:
a processor; and
a memory storing instructions that, when executed by the processor, cause the apparatus to:
receive a sequence of positional data associated with a performance of an entity in an event;
extract a segment of the positional data from the sequence of the positional data;
generate one or more feature maps derived from the segment of the positional data;
detect, by employing a neural-network-based action detector using the one or more feature maps, an action performed by the entity; and
detect, by employing a neural-network-based contact detector using the one or more feature maps, a contact between the entity and another entity in the event.

22. The apparatus of claim 21, wherein the memory stores additional instructions that, when executed by the processor, cause the apparatus to:
generate the sequence of the positional data based on an analysis of sensor data captured by one or more sensors positioned at a site of the event.

23. The apparatus of claim 21, wherein the memory stores additional instructions that, when executed by the processor, cause the apparatus to:
augment, based on data associated with the detected action, the one or more feature maps.

24. The apparatus of claim 21, wherein the one or more feature maps comprise feature data associated with a key point of the entity, including at least one of a position of the key point, a velocity of the key point, an angle between sections connected by the key point, an orientation of a section connected to the key point, a distance from the key point to other key points of the entity, a distance from the key point to key points of another entity, or a distance from the key point to a centroid location of other key points of the entity.

25. The apparatus of claim 24, wherein the key point is a joint.

26. The apparatus of claim 21, wherein the memory stores additional instructions that, when executed by the processor, cause the apparatus to:
before generating the one or more feature maps derived from the segment, normalize the segment.

* * * * *